(12) United States Patent
Jakusz et al.

(10) Patent No.: US 11,528,775 B2
(45) Date of Patent: Dec. 13, 2022

(54) SYSTEM AND METHOD FOR DYNAMIC MESH NETWORK DISCOVERY

(71) Applicant: Rockwell Collins, Inc., Cedar Rapids, IA (US)

(72) Inventors: Jason J. Jakusz, Nixa, MO (US); Titus N. Thompson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 108 days.

(21) Appl. No.: 17/188,458

(22) Filed: Mar. 1, 2021

(65) Prior Publication Data
US 2021/0274594 A1    Sep. 2, 2021

Related U.S. Application Data (60) Provisional application No. 62/983,385, filed on Feb. 28, 2020.

(51) Int. Cl.
| | |
|---|---|
| *H04W 84/18* | (2009.01) |
| *H04W 76/11* | (2018.01) |
| *H04W 4/06* | (2009.01) |
| *H04W 4/80* | (2018.01) |

(52) U.S. Cl.
CPC ............. *H04W 84/18* (2013.01); *H04W 4/06* (2013.01); *H04W 4/80* (2018.02); *H04W 76/11* (2018.02)

(58) Field of Classification Search
None
See application file for complete search history.

(56) References Cited

U.S. PATENT DOCUMENTS

| | | | |
|---|---|---|---|
| 6,594,273 B1 | 7/2003 | McGibney | |
| 7,978,666 B2 | 7/2011 | Keshavarzian et al. | |
| 9,819,747 B2 | 11/2017 | daCosta | |
| 10,123,262 B2 | 11/2018 | Kuehnel et al. | |
| 11,310,718 B2 * | 4/2022 | King | H04W 48/16 |
| 2005/0135286 A1 | 6/2005 | Nurminen et al. | |
| 2007/0195702 A1 | 8/2007 | Yuen et al. | |
| 2013/0094538 A1 | 4/2013 | Wang | |
| 2014/0321325 A1 | 10/2014 | Jing et al. | |
| 2015/0304879 A1 | 10/2015 | daCosta | |
| 2019/0007300 A1 | 1/2019 | Karanam et al. | |
| 2019/0294449 A1 | 9/2019 | Leon et al. | |

FOREIGN PATENT DOCUMENTS

CA            2750814 C      6/2014

* cited by examiner

*Primary Examiner* — Walter J DiVito
(74) *Attorney, Agent, or Firm* — Suiter Swantz pc llo (57) ABSTRACT

A system and method for dynamic mesh network discovery is disclosed. In embodiments, the system assigns each network asset (e.g., unmanned or manned aircraft or like mobile nodes) a unique asset number. Each asset has a controller coupled to a datalink including antenna elements and a memory for storing an asset table. Each asset periodically broadcasts an asset status message including the asset number. When a status message is received, the receiving asset compares the received asset number to its own asset number. If the received asset number is higher (e.g., of lower priority) than its own asset number, the receiving asset establishes a bidirectional mesh network connection to the broadcasting asset. Assets on the receiving end of a network connection interrogate the establishing asset for its asset number, such that assets on both sides of the connection know the identity of the other and update their asset tables accordingly.

8 Claims, 7 Drawing Sheets

SYSTEM AND METHOD FOR DYNAMIC MESH NETWORK DISCOVERY

STATEMENT REGARDING FEDERALLY SPONSORED RESEARCH AND DEVELOPMENT

The inventive concepts disclosed herein were made with government support under federal transaction agreement 140D041890001 awarded by Washington Headquarters Services (United States Department of Defense). The government has certain rights in the inventive concepts disclosed herein.

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 62/983,385 entitled MESH NETWORK DISCOVERY CONNECTION PROTOCOL, filed Feb. 28, 2020;

Said U.S. Patent Application 62/983,385 is herein incorporated by reference in its entirety.

BACKGROUND

Mesh networks, and/or ad hoc networks where nodes may connect and disconnect directly, dynamically, and in a generally decentralized fashion, can be extremely valuable in managing teams or "swarms" of unmanned aircraft systems (UAS), or a combination of manned and unmanned assets, in coordinating operations to accomplish collective goals. For this coordination of operations to function optimally, reliable communication is essential between any asset and any other asset within the swarm. While it may be ideal for a connection via TCP or other like protocols to be established between any two assets needing mutual communication, most such protocols are designed to connect two unequal or non-peer entities, e.g., client and server. For two peer "client" assets to communicate with each other, an unequal third note (e.g., analogous to the "server") would be required. Such a ground station or other control unit "server" is impractical for, e.g., a highly mobile mesh network of unmanned aircraft.

SUMMARY

A system for dynamic mesh network discovery (DMND) is disclosed. In embodiments, the system includes a local network asset having a unique ID number or like identifier. For example, the local asset may be one of a group or swarm of similar such assets associated with a mesh or ad hoc network, each asset having a unique identifier of a hierarchy of such identifiers (e.g., asset numbers may be associated with a priority level). The local asset has a controller connected to a datalink, the datalink including a radio frequency (RF) antenna. The local asset has an onboard memory linked to the controller, the memory capable of storing an asset table (e.g., indicating which assets or nodes are potential members of the mesh network) and instructions for the controller. For example, the controller broadcasts (e.g., at intervals) an asset status of the local asset, the asset status including the unique ID number. The controller may receive, via the datalink, asset statuses broadcast by other such assets. When an asset status is received, the controller assesses the priority or value of the received asset number as compared to its own asset number. If the local asset number of the controller is of a higher priority (e.g., a lower number) than the received asset number, the controller creates a bidirectional mesh network connection to the broadcasting asset or node, and updates its asset table with the received asset status. The just-added network asset interrogates the local asset in order to determine its identity; in response, the local asset transmits its own asset status to the network asset via the recently established bidirectional mesh network connection, and both assets know the identity of the other. If, however, the local asset number has a lower priority (e.g., a higher asset number) than the received asset number, the local asset ignores the network asset, e.g., by declining to add the network asset as a network client. Having ignored the network asset, however, the local asset still adds the received asset number or asset status to its asset table.

A DMND method is also disclosed. In embodiments, the method includes broadcasting to a mesh or ad hoc network, via a datalink of a local asset associated with the network, an asset status including a unique asset number. The method includes receiving an inbound asset status similarly broadcast by another asset associated with the network, the inbound asset status including a unique asset number of the broadcasting asset. Both the local asset number and the broadcasting asset number may be part of a hierarchical group of such asset identifiers (e.g., a ranked list of priority levels). The method includes, on receiving the inbound asset status, comparing (e.g., via a controller of the local asset) the inbound asset number to the local asset number. The method includes, if the local asset number has a higher priority than the inbound asset number (e.g., if the local asset number is lower), creating (e.g., via the local asset controller) a bidirectional mesh network connection to the broadcasting asset. The method includes adding the inbound asset status (and asset number) to the asset table (e.g., of the local asset controller). The method includes, on receiving the connection request, responding to an interrogation by the broadcasting asset by transmitting the local asset status to the broadcasting asset via the mesh network connection, so that both assets know the identity of the other. The method includes, if the local asset number is of lower priority (e.g., higher asset number) than the broadcasting asset, ignoring the broadcasting asset by declining to add the broadcasting asset as a network client of the local asset. The method includes adding the ignored asset status and asset number to the local asset table.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for dynamic mesh network discovery is for dynamic mesh network discovery. In embodiments, the system assigns each network asset (e.g., unmanned or manned aircraft or like mobile nodes) a unique asset number. Each asset has a controller coupled to a datalink including antenna elements and a memory for storing an asset table. Each asset periodically broadcasts an asset status message including the asset number. When a status message is received, the receiving asset compares the received asset number to its own asset number. If the received asset number is lower (e.g., of higher priority) than its own asset number, the receiving asset establishes a bidirectional mesh network connection to the broadcasting asset. Assets on the receiving end of a network connection interrogate the establishing asset for its asset number, such that assets on both sides of the connection know the identity of the other, and update their asset tables accordingly.

Figure 1:
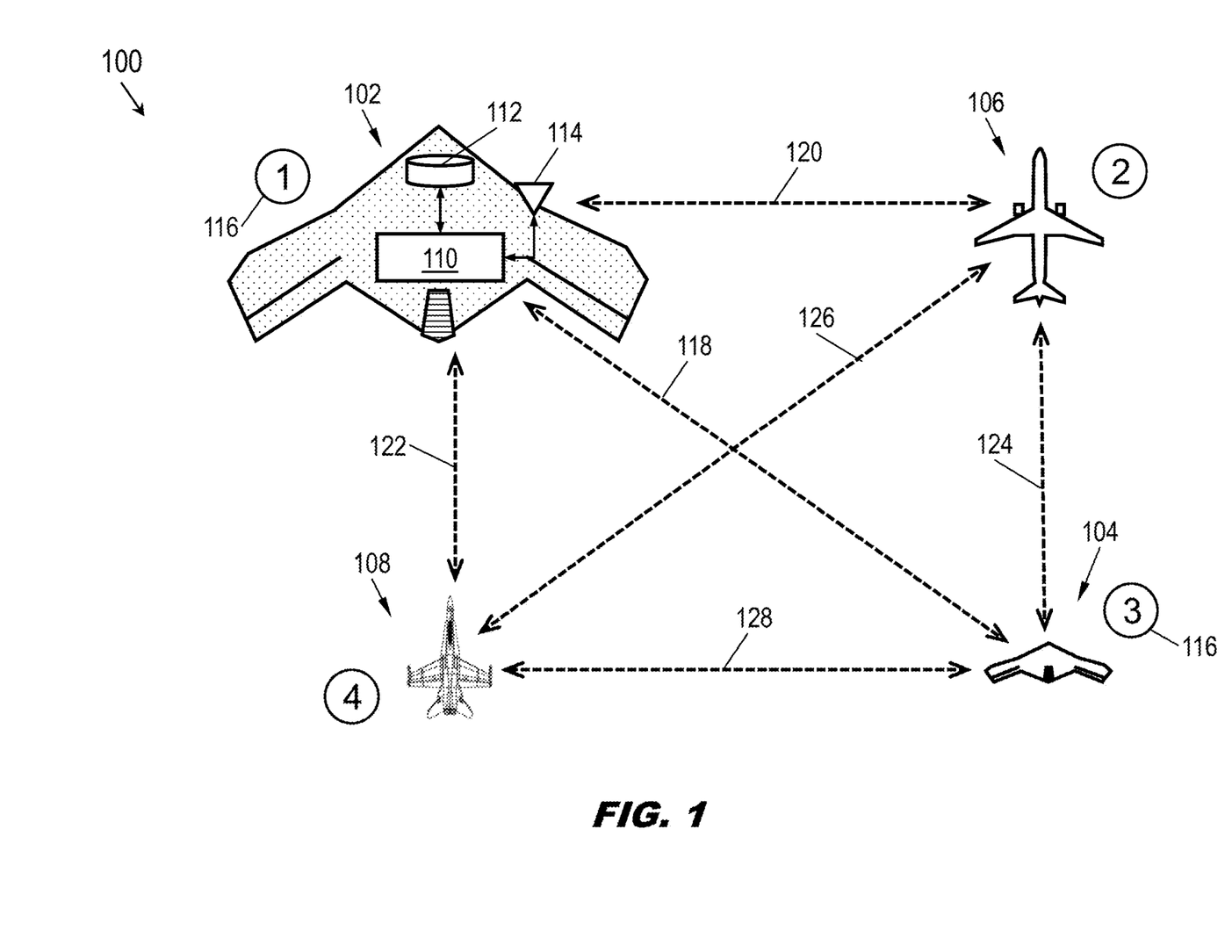
FIG. 1 is a diagrammatic illustration of a system for dynamic mesh network discovery according to embodiments of the inventive concepts disclosed herein.

Referring to FIG. 1, a diagrammatic illustration of a system for dynamic mesh network discovery according to embodiments of the inventive concepts disclosed herein is shown. Generally, the system 100 may include a swarm or network (e.g., a wireless radio mesh network) of assets engaged in collaborative operations toward a collective goal. The swarm may include, for example, unmanned assets 102, 104 (e.g., unmanned assets) and manned aircraft 106, 108 (e.g., manned assets). Each asset of the network, e.g., the unmanned assets 102, 104 and the manned assets 106, 108, may include an asset controller 110, a tangible, non-transitory memory unit 112, and antenna elements 114.

In embodiments, the asset controller 110 may include control processors for maintaining a datalink between, e.g., the unmanned asset 102 and other assets within the network (e.g., the unmanned asset 104 and manned assets 106, 108). Each asset within the network may have its own unique network address (e.g., stored by the memory unit 112), but these network addresses may not necessarily be pre-known by other network assets. Any asset within the network may serve as a "server" to which other assets may connect; however, if conventional network connection topology is followed, each asset would connect to each other asset and the number of connections within the network would grow exponentially (e.g., $n^2-n$ connections for n assets), which may strain a network with limited resources and bandwidth.

In embodiments, the system 100 for dynamic mesh network discovery may optimize the efficiency of the network by assigning a unique asset number 116 (e.g., asset identifier, asset ID) to each asset within the network. For example, the unique asset numbers 116 may represent a hierarchy of priorities, such that the unmanned asset 102 is assigned an asset number 1 (e.g., which may indicate a relatively high priority); the manned assets 106, 108 are assigned asset numbers 2 and 4 respectively; and the unmanned asset 104 is assigned an asset number 3 (e.g., which may indicate a relatively low priority). Unique asset numbers 116 (e.g., an asset's own number as well as those of other network assets) may be logged in an asset table stored within the memory unit 112. In some embodiments, the asset table may include a list of potential network assets with which bidirectional mesh network connections may be established.

In embodiments, each asset within the network may periodically broadcast (e.g., via datalink) asset status messages to the network including its asset number 116. Asset status messages may be broadcast to the network "in the blind", e.g., via user datagram protocol (UDP), unicast, multicast, or any other appropriate connectionless protocol. For example, at regular intervals the unmanned asset 104 having unique asset number 3 (116) may broadcast asset status messages including the asset number to the network. The unmanned asset 102 (and any other assets within the network) may receive this asset status message (e.g., via radio frequency (RF) antenna elements 114) and compare the received asset number (3) to its own unique asset number (1). If the receiving unmanned asset 102 determines that the transmitting unmanned asset 104 has a larger asset number (e.g., a lower priority level) than its own asset number, the unmanned asset 102 may create a bidirectional mesh network connection (118) to the unmanned asset 104 and add the unique asset number 116 of the unmanned asset 104 to its asset table.

Similarly, the unmanned asset 102 may periodically broadcast its own asset status message (including its own unique asset number (1)) throughout the network. The unmanned asset 104 may likewise receive this asset status message and compare the asset number 116 of the transmitting unmanned asset 102 to its own asset number. As the received asset number (1) of the unmanned asset 102 is lower than its own asset number (3), the unmanned asset 104 may ignore the received asset status message (e.g., decline to create a mesh network connection to the unmanned asset 102) but store the received asset status (e.g., the unmanned asset 102 and its associated asset number 116) to its own asset table.

In embodiments, each network asset creates a bidirectional mesh network connection only those network assets having a higher asset number 116 (e.g., having a lower priority). For example, the unmanned asset 102 (having an asset number 1) may establish bidirectional mesh network connections 118, 120, 122 to the unmanned asset 104 (having asset number 3) and the manned assets 106 and 108 (having, respectively, asset numbers 2 and 4). Similarly, the manned asset 106 (having asset number 2) may establish bidirectional mesh network connections 124, 126 to the unmanned asset 104 and the manned asset 108 (having, respectively, asset numbers 3 and 4). Finally, the unmanned asset 104 (having asset number 3) may establish a bidirectional mesh network connection 128 solely to the manned asset 108 (having asset number 4). In this way, as the number of assets n within the network increases, the number of connections within the network may grow at half the conventional rate (e.g., $(n^2-n)/2$ connections for any n assets).

Figure 2A:
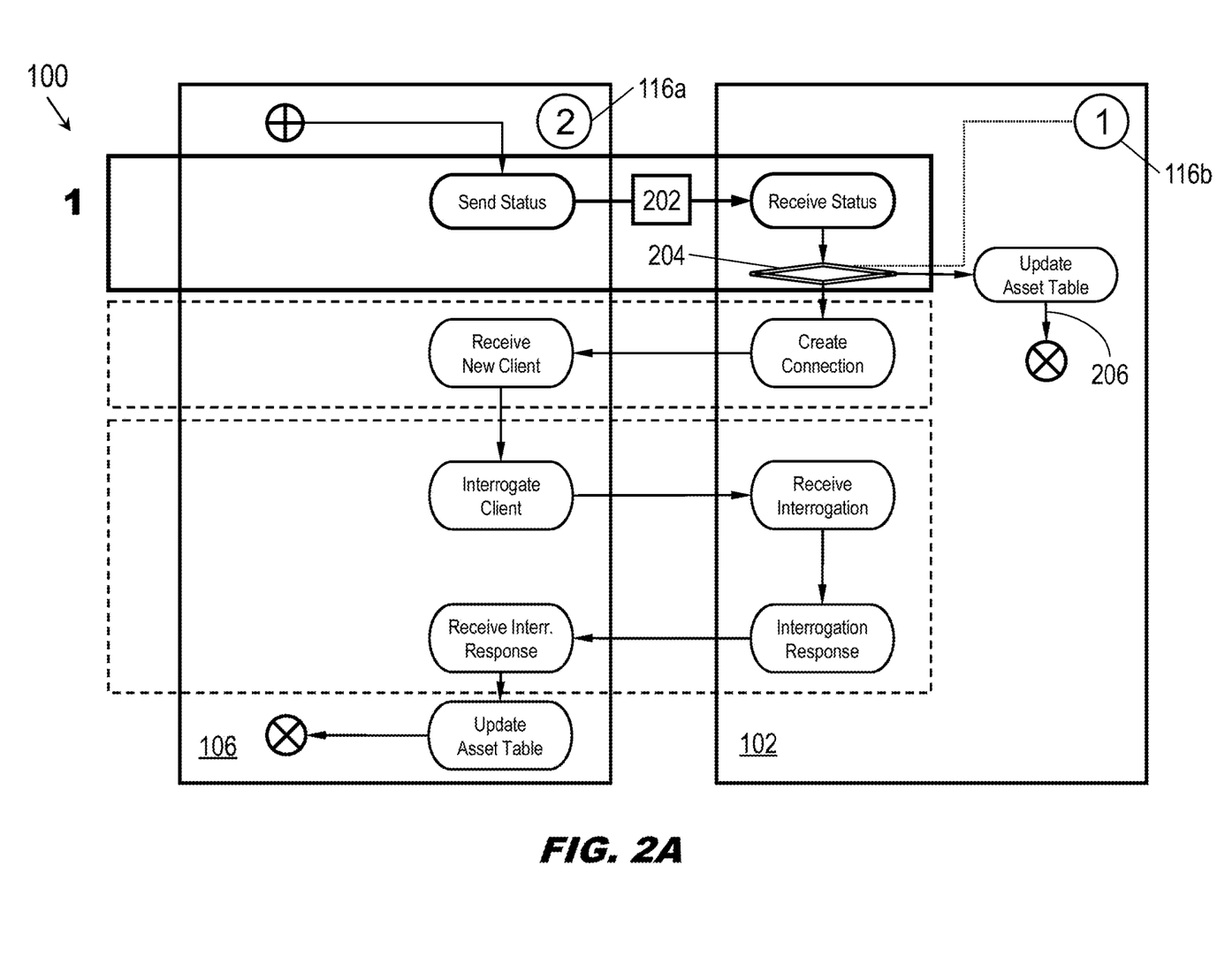
FIGS. 2A through 2C are diagrammatic illustrations of operations of the system of FIG. 1.
Figure 2B:
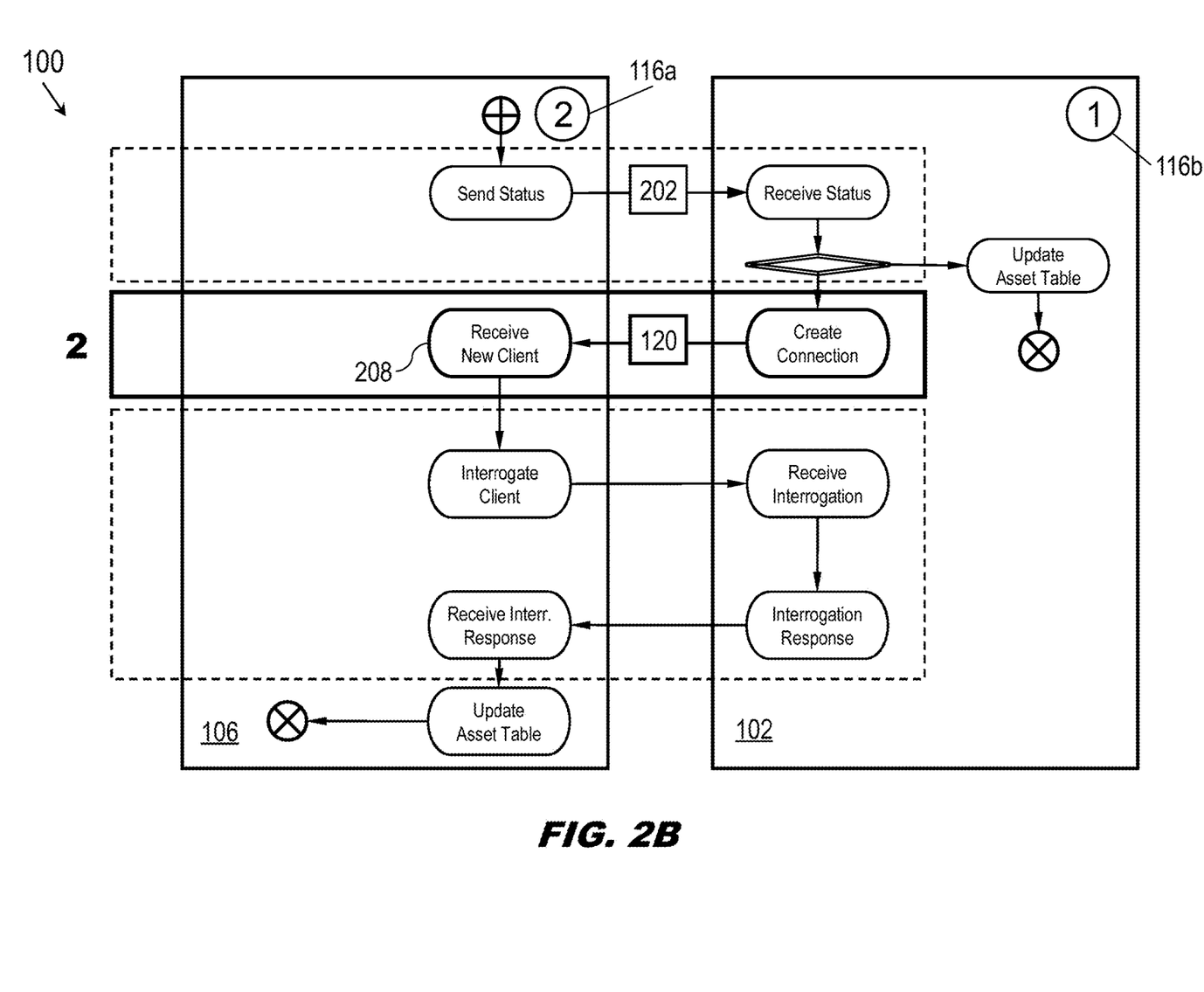
Figure 2C:
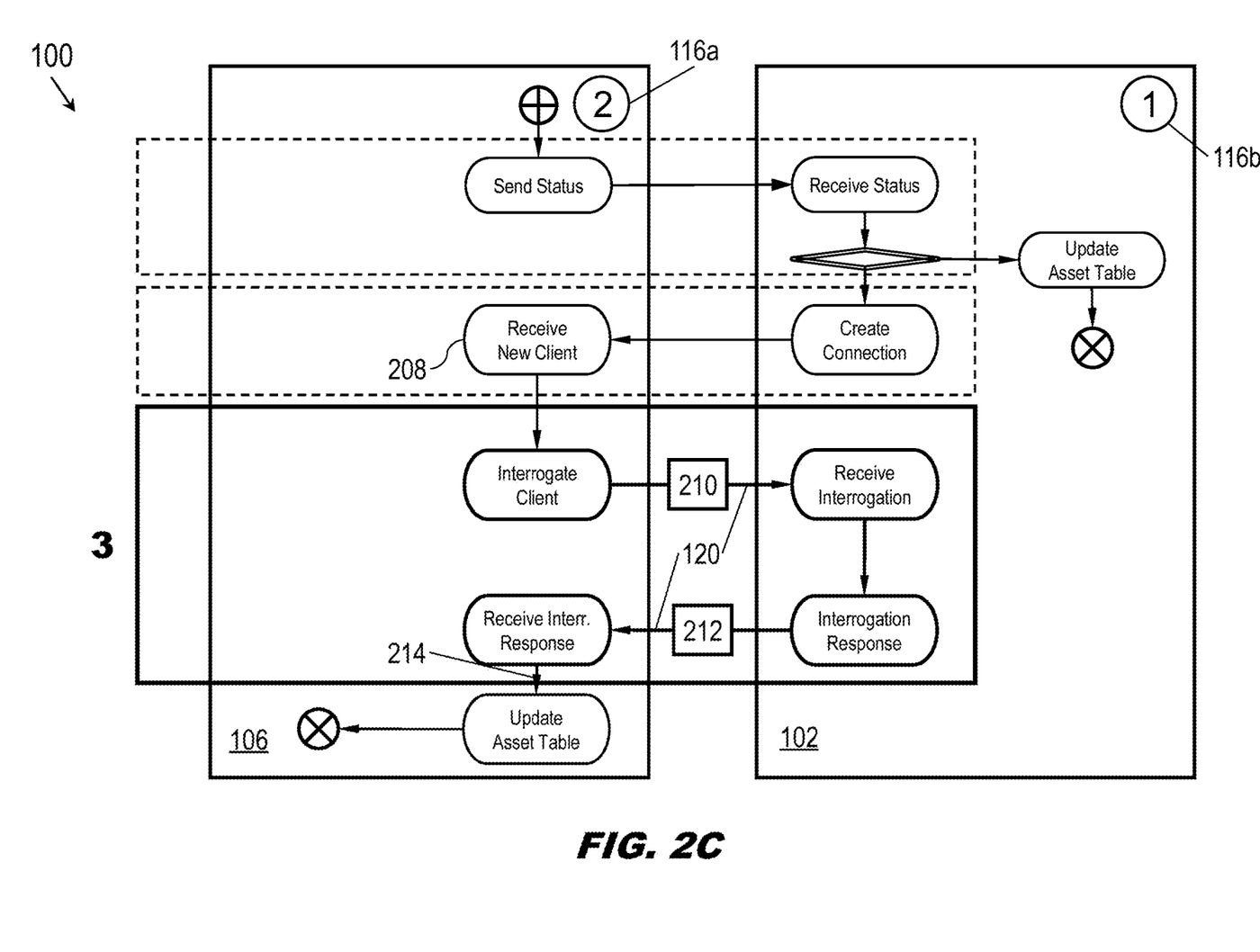

Referring to FIGS. 2A through 2C, operations of the system 100 for dynamic mesh network discovery are shown.

In embodiments, referring to FIG. 2A, the manned asset 106 may, at predetermined intervals, broadcast an asset status message 202 throughout the network. For example, the asset status message 202 may include the unique asset number 116a and the unique network address assigned to the manned asset 106 (e.g., "2"). The unmanned asset 102 (and any other assets within the network) may receive (e.g., via RF antenna elements (114, FIG. 1) and decode (e.g., via the asset controller 110) the asset status message 202 to determine the unique asset number 116a and network address of the transmitting manned asset 106. The asset controller 110 of the receiving unmanned asset 102 may compare (204) the received unique asset number 116a ("2") to its own unique asset number 116b ("1") and update its asset table (206) to include the manned asset 106 and its unique asset number 116a.

In embodiments, referring also to FIG. 2B, the asset controller 110 of the unmanned asset 102 may determine that the received unique asset number 116a ("2") of the transmitting manned asset 106 is higher than its own unique asset number 116b ("1"). Accordingly, the unmanned asset 102 may establish a bidirectional mesh network connection 120 to the manned asset 106 (e.g., via the network address assigned to the manned asset 106 and included in the asset status message 202). For example, the bidirectional mesh network connection 120 may incorporate a managed protocol (e.g., TCP) for flow control and guaranteed delivery. The manned asset 106 may detect the bidirectional mesh network connection 120 and receive the unmanned asset 102 as a new client (208), but may not yet know the identity of the connecting asset.

In embodiments, referring also to FIG. 2C, the asset controller 110 of the manned asset 106 may interrogate (210) the new client (e.g., the connecting unmanned asset 102), requesting that the new client identify itself. The connecting unmanned asset 102 may respond (212) to the interrogation 210 by sending, via the bidirectional mesh network connection 120, its unique asset number 116b ("1") and unique network address to the interrogating manned asset 106. In this way, both assets on either end of the bidirectional mesh network connection 120 know the identity of the other, and a single managed connection may be maintained between the two assets.

Referring now to FIG. 3, a method 300 for dynamic mesh network discovery is shown. The method 300 may be implemented by the system 100 for dynamic mesh discovery of FIGS. 1 through 2C and may include the following steps.

Figure 3A:
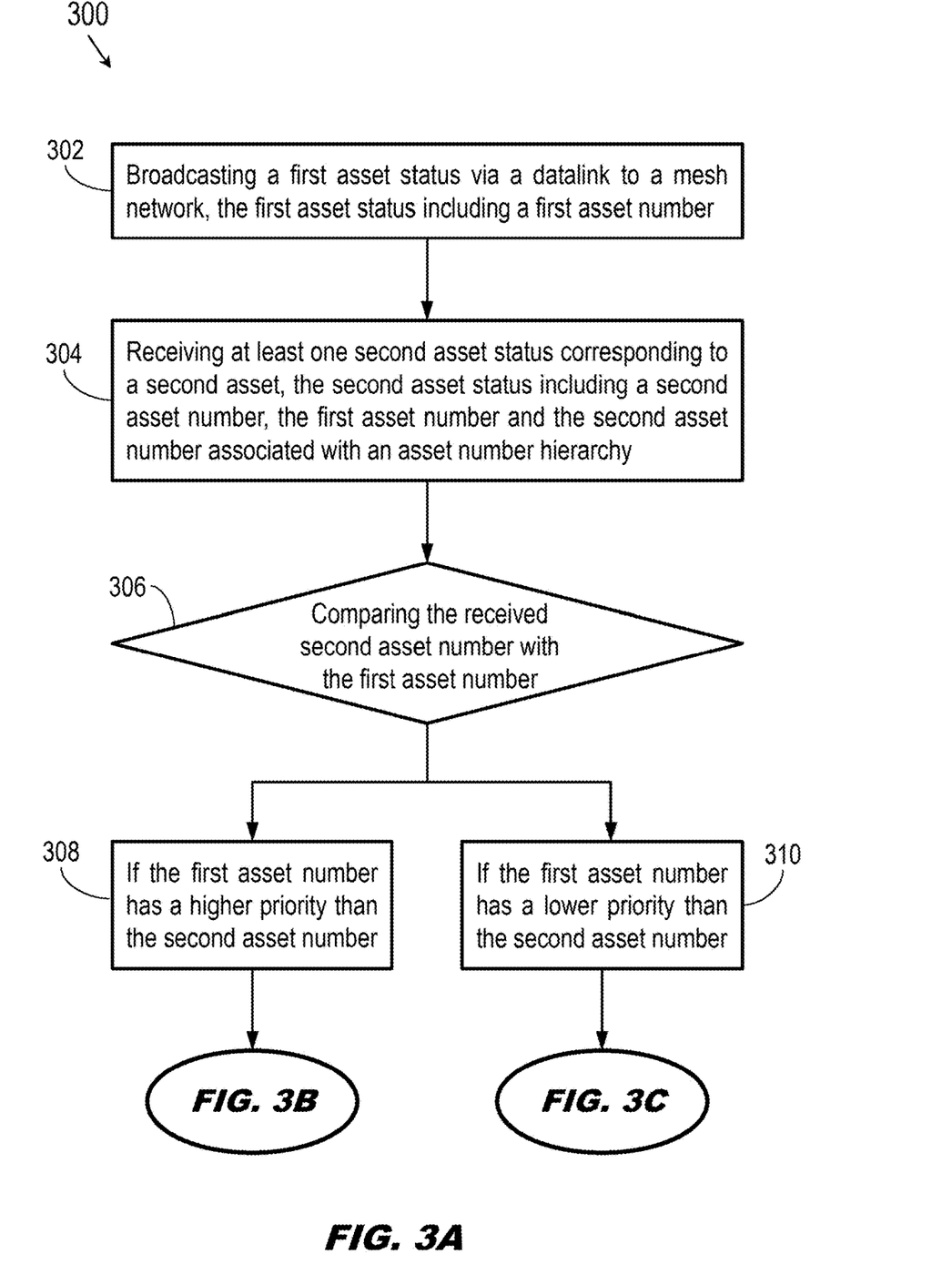
FIGS. 3A through 3D are flow diagrams illustrating a method for dynamic mesh network discovery according to embodiments of the inventive concepts disclosed herein.

At a step 302, a first network asset broadcasts via datalink an asset status message including a unique asset number assigned to the first network asset.

At a step 304, the first network asset receives an asset status message from a second network asset; the received asset status message includes a second unique asset number assigned to the second network asset (the first and second unique asset numbers being part of a hierarchical or priority list of asset numbers or identifiers). For example, the received asset status message may also include a unique network address assigned to the second network asset.

At a step 306, the first network asset compares the received second asset number to its own unique asset number.

At a step 308, the first network asset determines that its own first asset number is lower (e.g., has a higher priority) than the received second asset number assigned to the second network asset.

At a step 310, the first network asset determines that its own first asset number is higher (e.g., has a lower priority) than the received second asset number assigned to the second network asset.

Figure 3B:
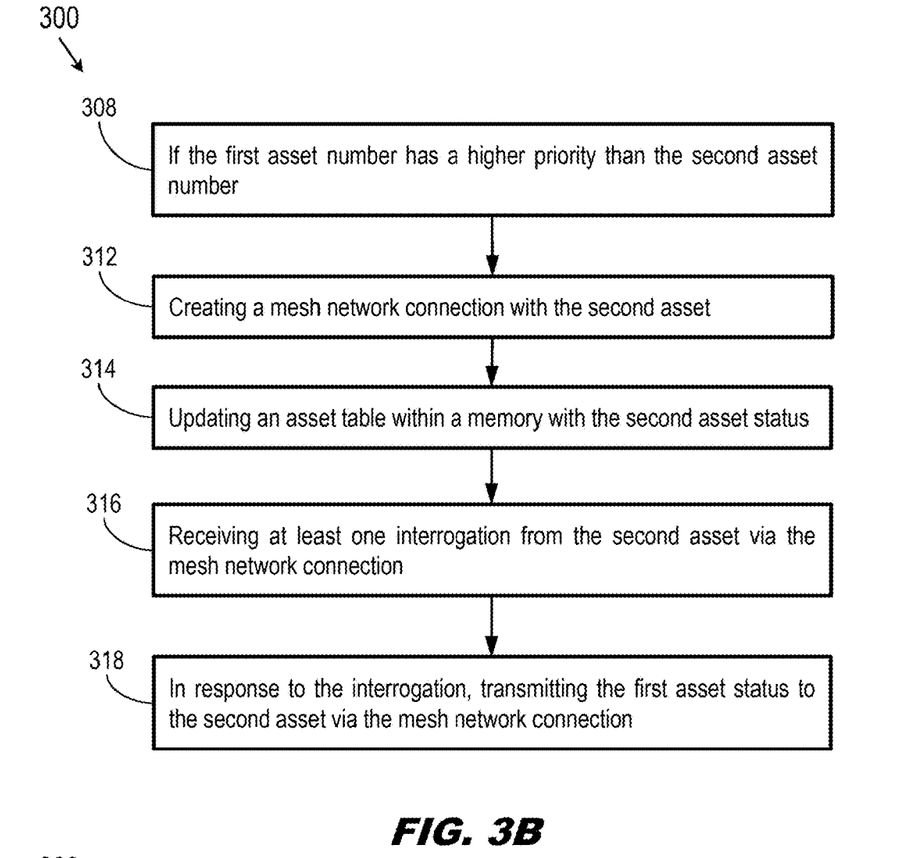

Referring to FIG. 3B, if the first network asset determines that its own first asset number is lower (e.g., has a higher priority) than the received second asset number assigned to the second network asset (per step 308), then at a step 312, the first network asset creates a bidirectional mesh network connection to the second network asset (e.g., receives the second network asset as a new client). For example, the first network asset may create the bidirectional mesh network connection to the received network address assigned to the second network asset.

At a step 314, the first network asset updates an asset table (e.g., stored to onboard memory) with the received second asset status (e.g., adds the received second asset number to its asset table).

At a step 316, the first network asset receives, via the bidirectional mesh network connection, an interrogation from the second network asset requesting the first network asset identify itself.

At a step 318, the first network asset responds to the interrogation by transmitting to the second network asset, via the bidirectional mesh network connection, a first asset status message including the unique asset number assigned to the first network asset.

Figure 3C:
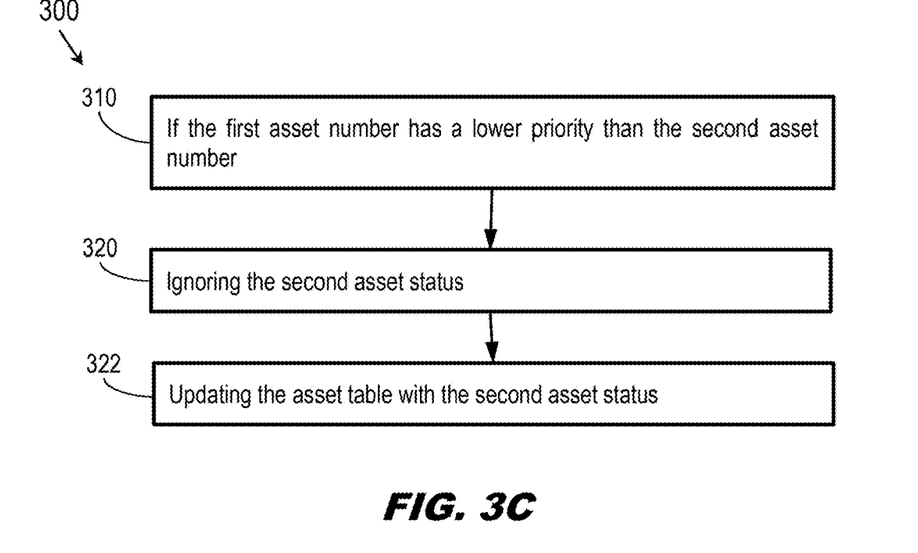

Referring to FIG. 3C, if the first network asset determines that its own first asset number is higher (e.g., has a lower priority) than the received second asset number assigned to the second network asset (per step 310), then at a step 320, the first network asset ignores the received asset status message (e.g., declines to add the second network asset as a client).

At a step 322, having ignored the received asset status message, the first network asset adds the received second asset number of the second network asset to its asset table.

Figure 3D:
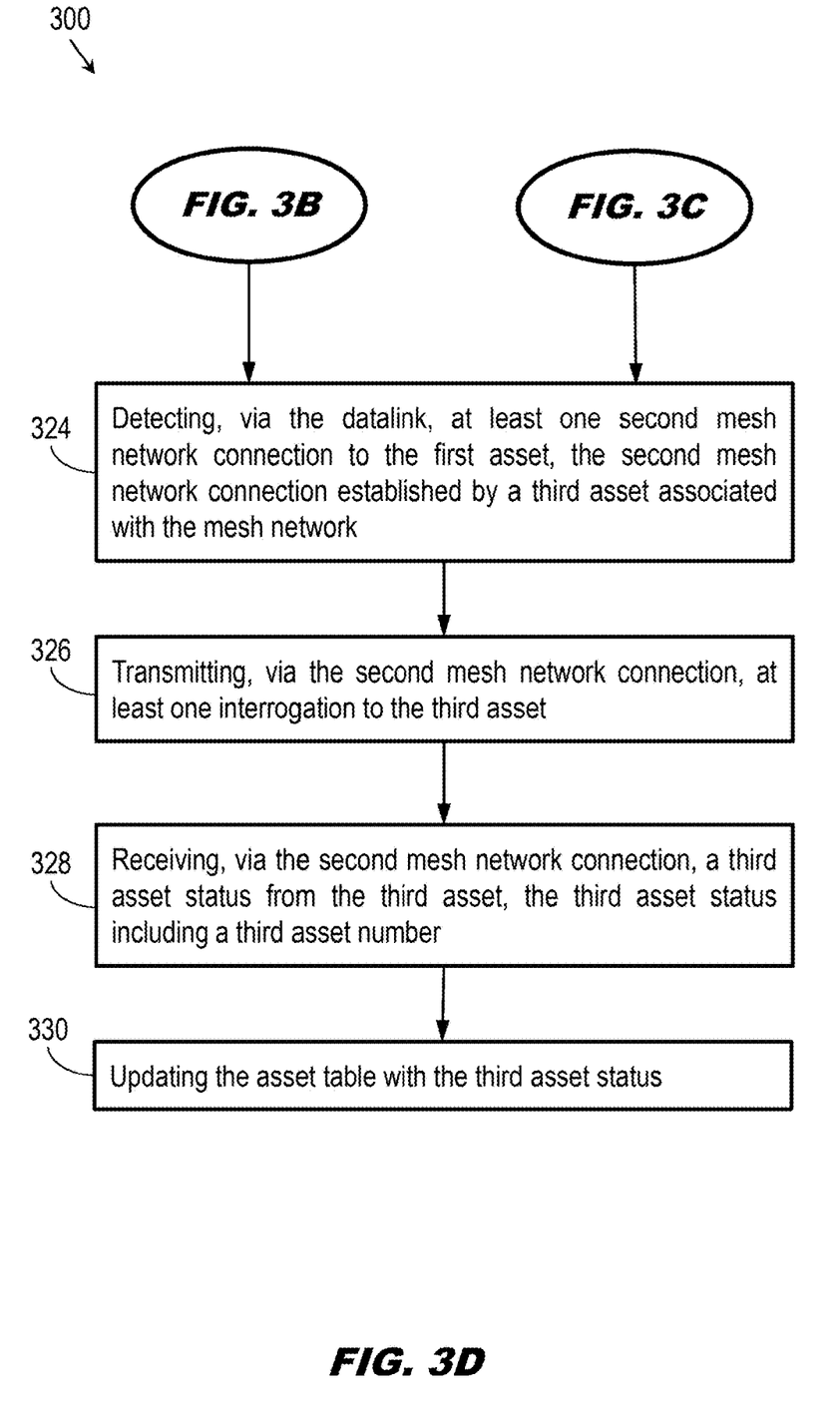

Referring to FIG. 3D, the method 300 may include the additional steps 324 through 330. At the step 324, the first network asset detects a second bidirectional mesh network connection created to the first network asset by a third network asset.

At a step 326, the first network asset transmits, via the second bidirectional mesh network connection, an interrogation to the third network asset requesting the third network asset identify itself.

At a step 328, the first network asset receives from the third network asset, via the second bidirectional mesh network connection a response to the interrogation including a third unique asset number assigned to the third network asset. In some embodiments, the response may include a third network address assigned to the third network asset.

At the step 330, the first network asset updates its asset table with the received third asset status, e.g., the third unique asset number assigned to the third asset.

CONCLUSION

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for dynamic mesh network discovery, comprising:
   a first asset having a first asset number, the first asset a peer of at least one second asset having a second asset number, the first asset and the second asset associated with a mesh network;
   the first asset having a controller coupled with a datalink including a radio frequency (RF) antenna, the controller including at least one processor;
   a tangible, non-transitory memory configured to communicate with the controller and configured for storage of:
      at least one asset table; and
      encoded instructions that, in response to execution by the controller, cause the controller to:
         broadcast a first asset status via the datalink to the mesh network, the first asset status including the first asset number;
         receive, via the datalink, a second asset status of the second asset, the second asset status including a second asset number, the first asset number and the second asset number associated with a hierarchy of asset numbers;
         compare the received second asset number with the first asset number;
         if the first asset number has a higher priority than the second asset number:
            create a mesh network connection to the second asset;
            update the asset table with the second asset status;
            receive at least one interrogation from the second asset via the mesh network connection; and
            in response to the interrogation, transmit the first asset status to the second asset via the mesh network connection;
         if the first asset number has a lower priority than the second asset number:
            ignore the second asset status; and
            update the asset table with the second asset status.

2. The system for dynamic mesh network discovery of claim 1, wherein:
   the first asset status includes a first network address corresponding to the first asset;
   the second asset status includes a second network address corresponding to the second asset; and
   the controller is configured to create the mesh network connection to the second asset via the second network address.

3. The system for dynamic mesh network discovery of claim 1, wherein the mesh network connection is a first mesh network connection and the encoded instructions, in response to execution by the controller, cause the controller to:

detect at least one second mesh network connection to the first asset, the second mesh network connection established by a third asset associated with the mesh network;

transmit, via the second mesh network connection, at least one interrogation to the third asset;

receive, via the second mesh network connection, a third asset status from the third asset, the third asset status including a third asset number; and update the asset table with the third asset status.

4. The system for dynamic mesh network discovery of claim 1, wherein at least one of the first asset and the at least one second asset includes an unmanned aircraft system (UAS).

5. A method for dynamic mesh network discovery, comprising:

broadcasting a first asset status via a datalink to a mesh network, the first asset status including a first asset number;

receiving at least one second asset status corresponding to a second asset, the second asset status including a second asset number, the first asset number and the second asset number associated with an asset number hierarchy;

comparing the received second asset number with the first asset number;

if the first asset number has a higher priority than the second asset number:
  creating a mesh network connection with the second asset;
  updating an asset table within a memory with the second asset status;
  receiving at least one interrogation from the second asset via the mesh network connection; and
  in response to the interrogation, transmitting the first asset status to the second asset via the mesh network connection; and if the first asset number has a lower priority than the second asset number:
  ignoring the second asset status; and
  updating the asset table with the second asset status.

6. The method for mesh network discovery of claim 5, wherein:

broadcasting a first asset status via a datalink to a mesh network includes broadcasting a first network address corresponding to the first asset;

receiving at least one second asset status corresponding to a second asset includes receiving a second network address corresponding to the second asset; and creating a mesh network connection with the second asset includes creating a mesh network connection via the second network address.

7. The method for dynamic mesh network discovery of claim 5, further comprising:

detecting, via the datalink, at least one second mesh network connection to the first asset, the second mesh network connection established by a third asset associated with the mesh network;

transmitting, via the second mesh network connection, at least one interrogation to the third asset;

receiving, via the second mesh network connection, a third asset status from the third asset, the third asset status including a third asset number; and updating the asset table with the third asset status.

8. The method for dynamic mesh network discovery of claim 7, wherein receiving, via the second mesh network connection, a third asset status from the third asset includes:

receiving, via the second mesh network connection, a third network address corresponding to the third asset.

* * * * *